US011228229B2

(12) United States Patent
Magnusson et al.

(10) Patent No.: US 11,228,229 B2
(45) Date of Patent: Jan. 18, 2022

(54) ELECTRIC MACHINE WITH LIQUID COOLING

(71) Applicant: AROS ELECTRONICS AB, Mölndal (SE)

(72) Inventors: Patrik Magnusson, Borås (SE); Josef Gårdstam, Kållered (SE)

(73) Assignee: AROS ELECTRONICS AB, Mölndal (SE)

( * ) Notice: Subject to any disclaimer, the term of this patent is extended or adjusted under 35 U.S.C. 154(b) by 65 days.

(21) Appl. No.: 16/346,175

(22) PCT Filed: Oct. 9, 2017

(86) PCT No.: PCT/SE2017/050981
§ 371 (c)(1),
(2) Date: Apr. 30, 2019

(87) PCT Pub. No.: WO2018/088945
PCT Pub. Date: May 17, 2018

(65) Prior Publication Data
US 2020/0112232 A1    Apr. 9, 2020

(30) Foreign Application Priority Data
Nov. 8, 2016    (SE) .................................. 1651461-4

(51) Int. Cl.
*H02K 5/20* (2006.01)
*H02K 11/33* (2016.01)
(Continued)

(52) U.S. Cl.
CPC ................. *H02K 9/19* (2013.01); *H02K 5/20* (2013.01); *H02K 9/08* (2013.01); *H02K 11/21* (2016.01); *H02K 11/33* (2016.01)

(58) Field of Classification Search
CPC ...... H02K 11/21; H02K 11/215; H02K 11/22; H02K 11/33; H02K 5/1732; H02K 5/20; H02K 9/08; H02K 9/19
(Continued)

(56) References Cited

U.S. PATENT DOCUMENTS 5,798,586 A    8/1998  Adachi
6,087,744 A *  7/2000  Glauning ................ H02K 1/32
                                                     310/58
(Continued)

FOREIGN PATENT DOCUMENTS

EP    2 763 291      8/2014
JP    S62-178137     8/1987
WO    2016/098977    6/2016

OTHER PUBLICATIONS

International Search Report for PCT/SE2017/050981 dated Nov. 23, 2017, 3 pages.

*Primary Examiner* — Alex W Mok
(74) *Attorney, Agent, or Firm* — Nixon & Vanderhye P.C.

(57) ABSTRACT

Described are, among other things, an electric machine (10) and a housing (12) for an electric machine. The electric machine (10) is provided with a liquid cooling arrangement and comprises a housing (12). The housing (12) is formed as one unitary element and comprises a first space (30) in which first space (30) a stator (21) and a rotor (23) are located. The rotor (23) has a shaft (20). Further, a second space (50) is formed in the housing (12). In the second space (50) electronics (54) for operation of the electric machine is located. Also, a third space (40) is formed in the housing (12), the third space (40) is located, seen in axial direction of the shaft (20), between the first space (30) and the second space (50). The third space (40) comprises at least one inlet (18) for a cooling liquid and at least one outlet (28) for the cooling liquid.

21 Claims, 8 Drawing Sheets

(51) Int. Cl.
*H02K 9/08* (2006.01)
*H02K 11/21* (2016.01)
*H02K 9/19* (2006.01)

(58) Field of Classification Search
USPC .......................................................... 310/54
See application file for complete search history.

(56) References Cited

U.S. PATENT DOCUMENTS

| | | | |
|---|---|---|---|
| 2005/0194847 A1* | 9/2005 | Gromoll | H02K 9/14 310/54 |
| 2006/0057005 A1* | 3/2006 | Williams | F04D 29/426 417/423.14 |
| 2008/0185924 A1* | 8/2008 | Masoudipour | H02K 5/20 310/54 |
| 2011/0084561 A1* | 4/2011 | Swales | H02K 11/048 310/54 |
| 2014/0077633 A1 | 3/2014 | Nagao et al. | |
| 2014/0239755 A1 | 8/2014 | Nagao et al. | |
| 2014/0265664 A1* | 9/2014 | Camilleri | H02K 11/33 310/59 |
| 2014/0265670 A1 | 9/2014 | Chamberlin et al. | |
| 2015/0229186 A1* | 8/2015 | Sauer | B23P 15/26 310/54 |
| 2016/0079824 A1* | 3/2016 | McKinzie | H02K 9/22 310/63 |

\* cited by examiner

ELECTRIC MACHINE WITH LIQUID COOLING

This application is the U.S. national phase of International Application No. PCT/SE2017/050981 filed Oct. 9, 2017 which designated the U.S. and claims priority to SE Patent Application No. 1651461-4 filed Nov. 8, 2016, the entire contents of each of which are hereby incorporated by reference.

TECHNICAL FIELD

The present disclosure relates to an electric machine with liquid cooling. In particular, the present disclosure relates to an electric motor with water cooling.

BACKGROUND

An electric machine is a device that can be operated as a motor and/or as a generator. The electric machine is formed by a stator and a rotor. Electrical windings are either placed in the stator and in that case the rotor contains an inductive part or permanent magnets, or the electrical windings can be placed in the rotor in which case the stator has an inductive part or permanent magnets. Operation of an electric machine is always associated with losses in the windings and in the permanent magnets or in the inductive part. As a result of these losses heat is produced. Typically, heat is produced both in the stator and in the rotor.

An electric machine is typically also provided with electronics for drive and control of the electric machine. The operation of the electronics also produces heat.

The heat produced typically needs to be taken care of by cooling the electric machine to avoid overheating of the electric machine or parts thereof. This is particularly the case for high power applications. The methods by means of which heat is taken care of can differ depending on the application. In some applications, a cooling arrangement with high efficiency is required. The cooling arrangement is then most often based on a liquid cooling. Typically, the liquid used as coolant can be water.

US 2014/0265670 describes a cooling arrangement for an electric machine having integrated power electronics. In US 2014/0265670 cooling is provided to cool both the electric machine and the electronics of the machine. Other examples of combined liquid cooling of an electric machine and of the electronics of the electric machine are described in U.S. Pat. No. 5,798,586 and JPS62178137.

There is a constant desire to improve the performance of an electric machine including the cooling of an electric machine and the assembly process of the electric machine. Hence there is a need for an improved electric machine with liquid cooling.

SUMMARY

It is an object of the present invention to provide an improved electric machine, and in particular to an improved cooling of an electric machine. It is also an object of the present invention to provide an electric machine that can be manufactured with a reduced assembly process.

This object and/or others are obtained by the electric machine as set out in the appended claims.

As has been realized, existing cooling arrangements for electric machines such as permanent magnet motors and reluctance motors require much space, provide cooling limitations and are complex to assemble. For example, when providing a motor for powering different units in a vehicle, in particular in a heavy vehicle such as a bus or a truck, there is typically a requirement for high power and at the same time there are strict space limitations. The units to be powered can for example be hydraulic pumps and similar units installed in a vehicle. Such units installed in a vehicle need to be compact, need to have efficient cooling and need to be robust given the conditions that they are set to operate in.

A main drawback of existing cooling arrangements is that a complex structure of the machine is required. For example, the liquid cooling arrangement in US 2014/0265670 requires complex parts to be assembled to provide the cooling arrangement. This will result in a complex assembly process. Also, the complex structure of the electric machine will suffer from robustness problems given the large amount of assembly components required.

In accordance with the present invention a cooling arrangement is provided that requires fewer components and which at the same time can provide an improved cooling efficiency compared to existing electric machines with liquid cooling. The cooling arrangement in accordance with the present invention is able to both cool the electric machine and at the same time the electronics used for operating the electric machine with high performance and requiring little space. At the same time, the structure of the electric machine is robust and is easy to assemble. This is obtained by providing a cooling arrangement, seen in an axial direction, between the electric machine and the electronics operating the electric machine where the housing of the electric machine is manufactured as one unitary element, i.e. an undivided housing provided to enclose stator/rotor, cooling arrangement and electronics. The unitary element can for example be formed in a casting process or in alternative processes such as for example cold forming, thermoforming or hydroforming. Hence, a "slice" of the housing for the electric machine is dedicated mainly for cooling purposes. The "slice" has at least one surface facing the stator and rotor for cooling the electric machine and at least one other surface facing the electronics. In other words, the cooling arrangement can be completely "sandwiched" between the electric machine and the electronics for operation of the electric machine within one integral housing that typically can be a casting. In the cooling arrangement, a liquid coolant is circulated. The cooling arrangement is typically formed by a space in the housing of the electric machine in which space the liquid coolant can enter and exit to cool surfaces of the space. The cooled surfaces are in direct contact with surfaces of spaces where the stator and the rotor and where the electronics are located, respectively. Hereby, the spaces for the stator and the rotor and for the electronics can be efficiently cooled. In case the electric machine is located in a vehicle having a circulating cooling system the cooling arrangement can be directly connected to such a pre-existing cooling system via an inlet and an outlet connected to the circulating coolant system of the vehicle. Because the cooling arrangement can be formed as a space with low flow resistance the flow rate in the space forming the cooling arrangement can be made high.

The arrangement described above will result in a very compact electric machine with high cooling capacity and with high robustness that is easy to assemble. An electric machine provided with a cooling arrangement as described herein is suitable for use in applications where there is a high requirement for power resulting in a need for high cooling capacity and where strict space limitations also exist. Further, by casting the housing in one integral element, the amount of material can be reduced since no dedicated complex cooling circuitry needs to be provided. As alternative to casting the housing as one single undivided part, the housing can be produced using cold-forming, thermoforming or hydro-forming.

In accordance with one embodiment an electric machine is provided. The electric machine is provided with a liquid cooling arrangement and comprises a housing. The housing comprises in one cast integral element a first space, a second space and a third space. In the first space, a stator and a rotor are located. The rotor has a shaft. Further, a second space is formed in the housing. In the second space electronics for operation of the electric machine is located. Also, a third space is formed in the housing. This third space is located, seen in an axial direction of the shaft, between the first space and the second space. The third space comprises at least one inlet for a cooling liquid and at least one outlet for the cooling liquid. Hereby a cooling arrangement that is configured to simultaneously cool the electric machine and the electronics of the machine is provided. The cooling arrangement can be of small radial dimensions since the cooling arrangement does not need to extend radially outside the electric machine and or the electronics for operating the electric machine. The structure will be very robust and will have few components that need to be assembled. The amount of material for forming the cooling arrangement will be very limited. Also, by casting the housing as one integral element will enhance the cooling properties of the cooling arrangement since the housing can more easily transfer heat away from the hot parts of the electric machine. Also, heat produced in the windings can be transferred via the housing to the cooling arrangement in this manner. This is particularly the case when the housing is made of a material having good heat conducting properties such as Aluminum or some other material comprising a metal.

In accordance with one embodiment, the third space is arranged to be sealed from the first space by a lid. Hereby, assembly of the electric machine and the housing thereof can be facilitated. The lid can be a part of the stator. In accordance with one embodiment at least one sealing member is provided in at least one of the lid and/or a section of the housing defining the third space. Hereby an efficient seal can be provided that keeps the coolant enclosed within the third space.

In accordance with one embodiment, the third space is arranged to be sealed from the second space by a lid. Hereby, assembly of the electric machine and the housing thereof can be facilitated. The lid can be a part of the electronics.

In accordance with one embodiment electronics is located on a surface, in particular a protruding surface, of the second space facing the third space. This is advantageous because cooling of the electronics can be improved if there is direct contact to the surface that is cooled from the other side by the circulating coolant.

In accordance with one embodiment a member for providing an air flow in the first space is provided in the first space. Hereby heat can be transferred with higher efficiency from the rotor towards the cooled inner surfaces of the first space. For example, the member for providing an air flow can be a fan mounted on the shaft of the rotor or some other device mounted on the rotor shaft, or a protrusion on the shaft itself.

In accordance with one embodiment, the shaft of the rotor extends into said second space and a portion of the shaft extending into the second space is provided with a code element for an encoder. Hereby an easy to implement speed/angle detector can be provided for the electric machine since the means to indicate the rotational speed or position of the shaft is extending into the space where the electronics is located and no additional wiring or sealing/grommet for wiring or other devices are required in the electric machine to provide a speed indicative signal to the electronics used for operating the electric machine. In accordance with one embodiment a reader of the encoder is located within the control electronics, or even directly assembled on the control circuit board.

In accordance with one embodiment, the third space is disc shaped. Hereby it is possible to make the third space have a large area facing the first space and also have a large area facing the second space. The result will be large cooling areas facing both the heat emitting parts of the electric machine, i.e. both the stator/rotor and the electronics used for operating the electric machine. At the same time, the additional space used for the cooling arrangement can be small, since the only space required is a few centimeters of additional axial length of the housing for the electric machine. In one embodiment, the cooling space is formed as a disc radially outside the bearing of the rotor shaft thus not demanding any additional axial length of the electrical machine. In accordance with one embodiment the housing is formed to let the liquid coolant only flow through the housing in a radial direction of the electric machine.

In accordance with one embodiment, a wall separates the third space from the second space. This wall can be formed as an integral part of the housing. Alternatively, a wall made as an integral part of the housing can be used to separate the third space form the first space. Such measures will further reduce time for assembly and improve heat transfer and thereby the cooling capacity of the cooling arrangement. The casting production method for the housing with such an integral wall permits to easily include fastening means there, such as for example protrusions for screws to easily assemble a control circuit board and fixation blocks for driving circuitry such as power modules. In accordance with one embodiment, a heat transferring but electrically isolating potting compound is provided between the stator and the inner surface of the first space. The potting can act to improve heat transfer from copper windings in the stator or other heat generating components. The potting compound can also be provided between the stator and the surface of the first space facing the third space. Hereby, an improved heat transfer from the stator to the cooled inner surface of the first space can be provided. The windings on the side of the stator that are located on the side opposite of the cooling space can be efficiently cooled as there will be a good thermal connection from the copper, via the potting compound and through the integral housing directly to the cooling media in the second space, without any joints between different housings and lids causing negative influence on the heat transfer.

The invention also extends to a housing for an electric machine formed as one integral, unitary element for example as a casting.

BRIEF DESCRIPTION OF THE DRAWINGS

The present invention will now be described in more detail by way of non-limiting examples and with reference to the accompanying drawings, in which.

DETAILED DESCRIPTION

Figure 1:
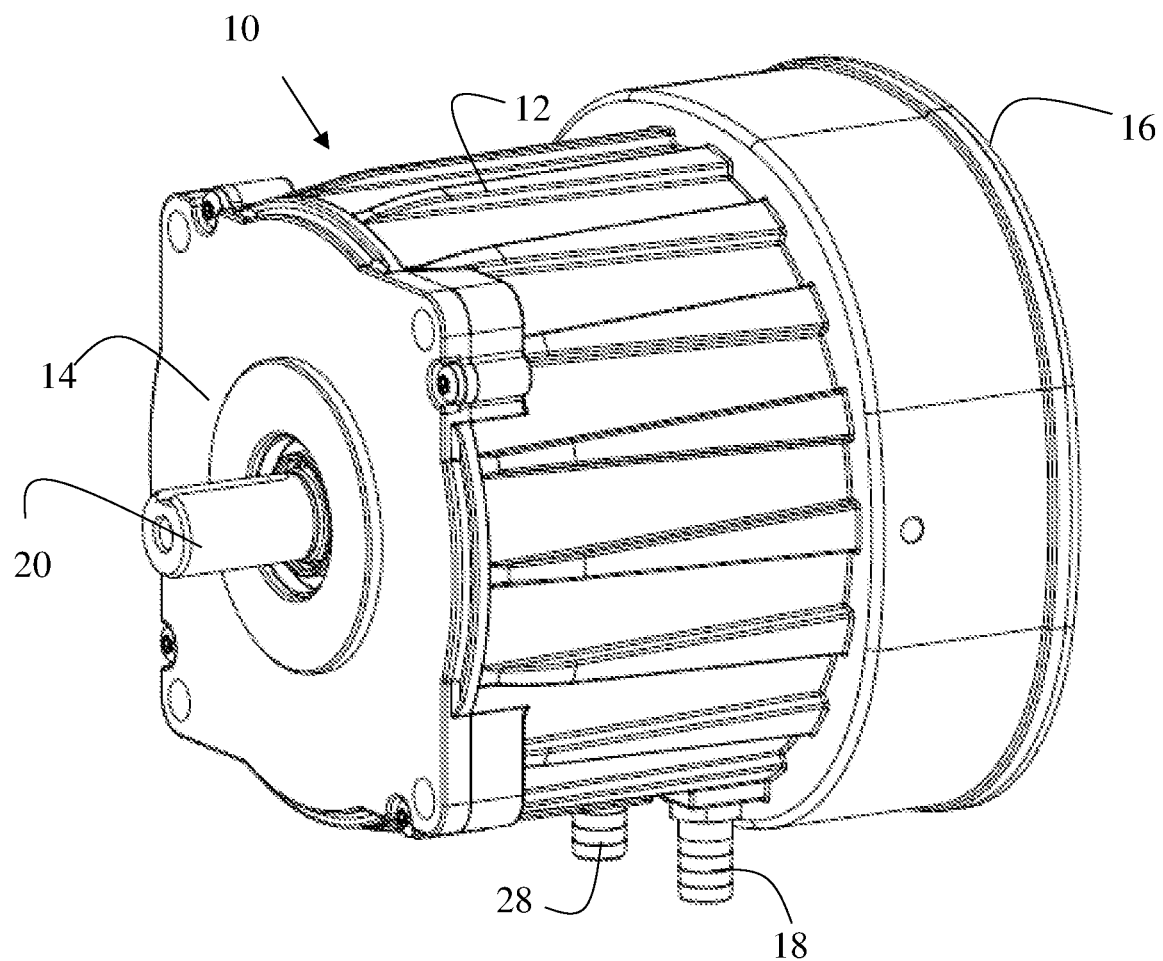
FIG. 1 is a view illustrating an electric machine.

In the following an electric machine and parts thereof will be described. In the Figures, the same reference numerals designate identical or corresponding elements throughout the several figures. It will be appreciated that these figures are for illustration only and are not in any way restricting the scope of the invention. Also, it is possible to combine features from different described embodiments to meet specific implementation needs.

The electric machine described below is a permanent magnet motor. However, the principles described herein are also possible to apply to other electric motors such as reluctance motors or when the electric machine is a generator.

In FIG. 1 an electric permanent magnet motor 10 is shown. The motor 10 can be a high-power motor for example for use in a vehicle such as a bus or a truck. For example, the motor can be dimensioned to generate a power in the magnitude of several kW, e.g. more than 3 kW. In such a motor, the heat losses will typically be in the order of several hundreds of Watts. This in combination with the strict space requirements that typically exist in many applications, such as in vehicle applications, will put high demands on an efficient cooling for the motor to operate correctly and in a robust and reliable manner.

In another embodiment, the electrical machine can be of a small type, for example a motor with a power of 100 W or a few hundreds of W and heat losses of about 10 W or more.

The motor in FIG. 1 comprises a housing 12. The housing has a front section 14 and a back section 16 attached thereto. Further, an inlet 18 and an outlet 28 for a liquid coolant such as water is provided. The motor 10 further has an output shaft 20.

Figure 2:
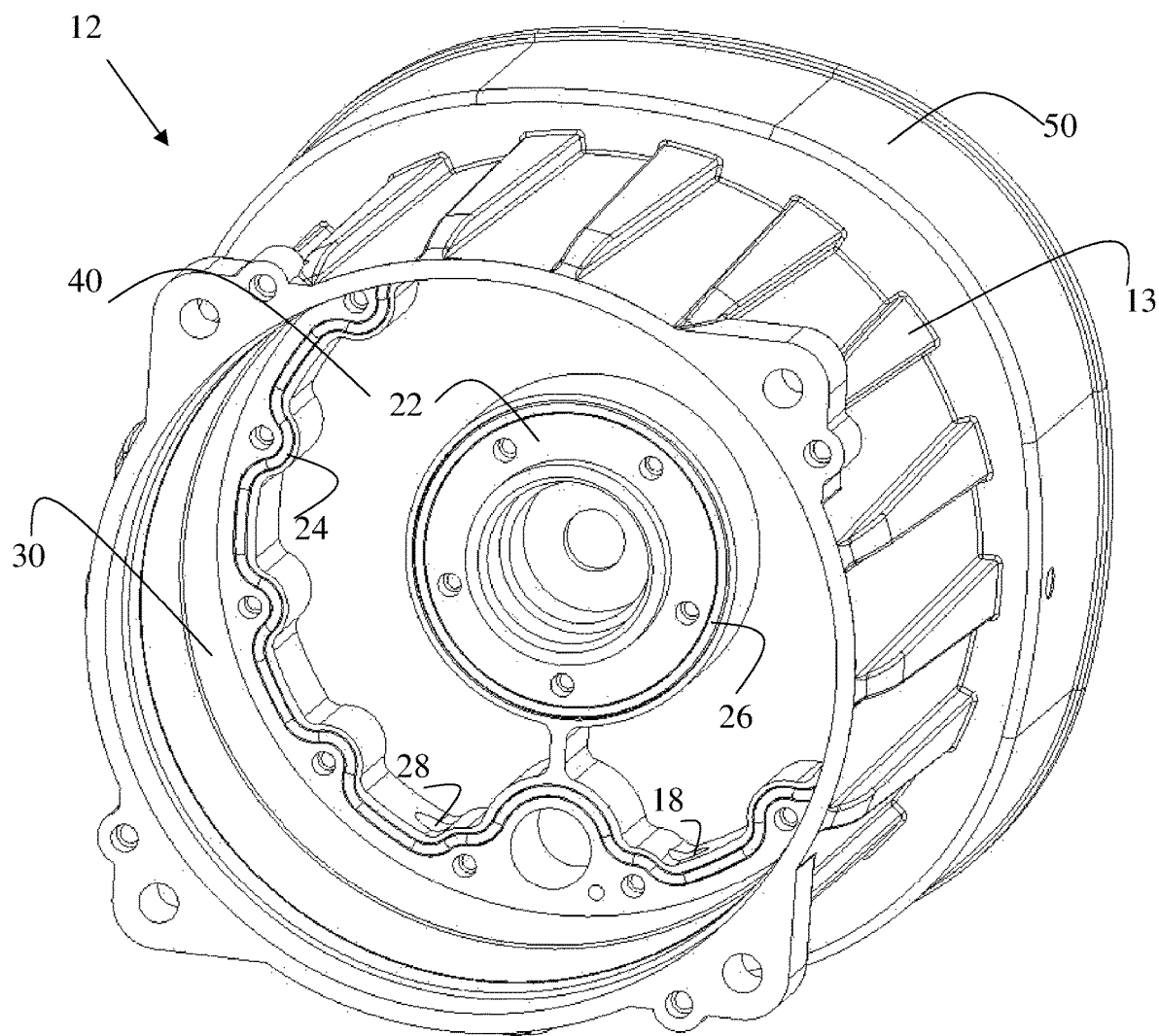
FIG. 2 is a frontal view in perspective of a housing for an electric machine.

In FIG. 2, the housing 12 is shown in more detail in a frontal view in perspective. The housing 12 comprises three different spaces that when the motor is in use are separated from each other as will be explained below. In a first space 30 the stator and rotor are to be located. In a second space 50 electronics for operation of the electric machine is to be located. Further a third space 40 is formed in the housing. The third space 40 is located sandwiched between the first space 30 and the second space 50. In other words, the third space 40 is located between the first space 30 and the second space 50 seen in an axial direction of the motor shaft 20. The third space 40 further comprises at least one inlet 18 for a liquid, in particular water, and at least one outlet 28 for the liquid. The third space 40 is arranged to be sealed from the first and second spaces 30, 50. To ensure a good seal against the first space 30, sealing members 24, 26 can be provided on the portions of the housing 12 defining the third space 40 and which portions face the first space 30. The sealing members can be of any suitable kind such as O-rings, an adhesive or gaskets of a suitable type.

The housing 12 can have a varying thickness along the perimeter of the housing. In accordance with one embodiment the varying thickness is provided by ribs 13 formed in the housing where the ribs extend in an axial direction of the housing. The ribs 13 can act to increase the heat transfer within the integral housing and at the same time enable a housing 12 having some radial flexibility, which is advantageous when fitting the stator into the housing during assembly of the electric machine. The housing 12 can advantageously be made of a material having good heat conductive properties such as a metal, e.g. Aluminum. The housing 12 can be cast in one piece thereby forming one integral element. In other words, the integral element forming the housing is one unitary casting. Alternatives to form the integral element are set out above. The housing 12 can extend over the entire axial length of the electric machine 10 and thereby radially surround all of the first, second and third spaces 30, 40 and 50.

Figure 3:
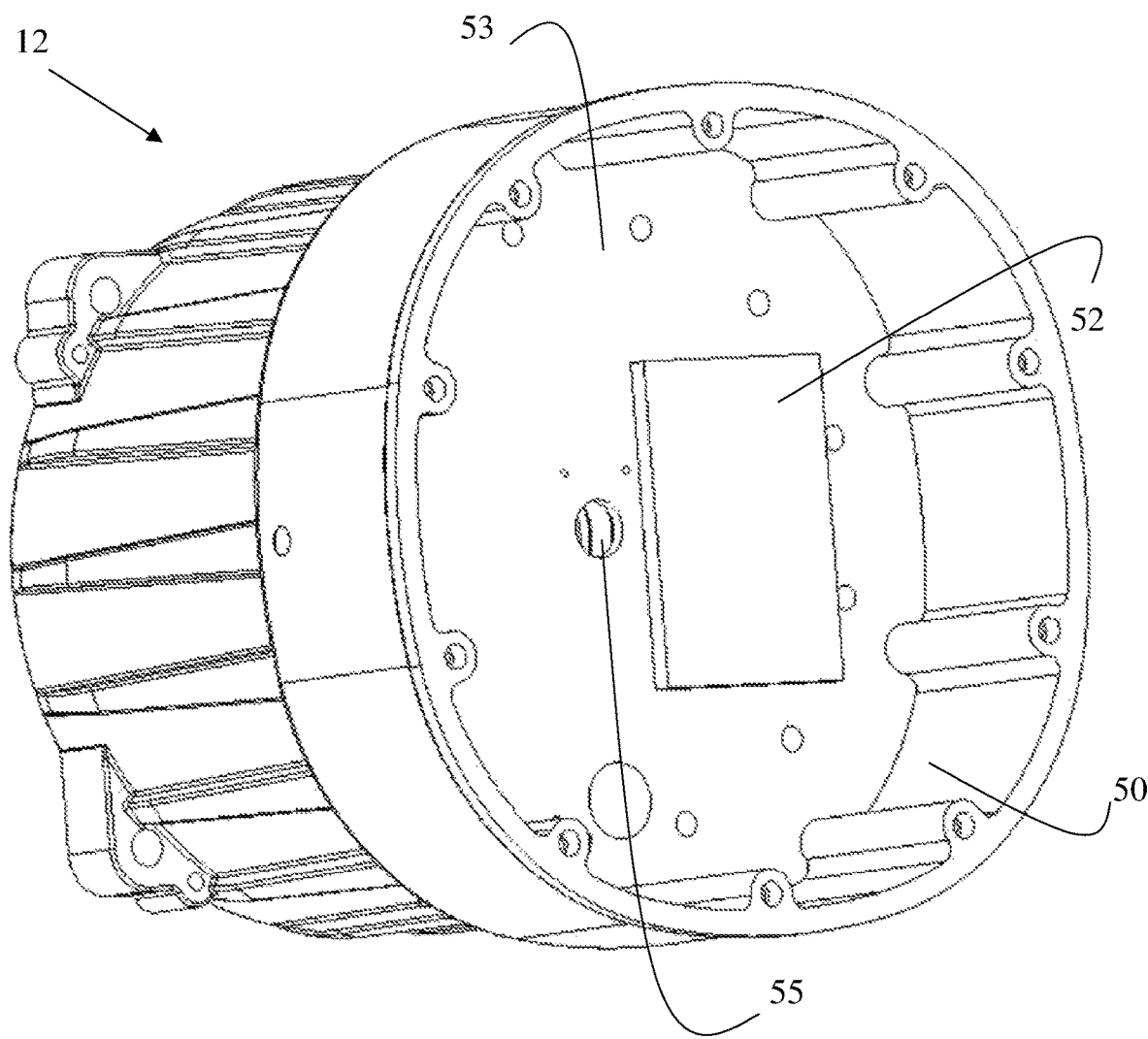
FIG. 3 is a rear view in perspective of a housing for an electric machine.

In FIG. 3, the housing 12 is shown in more detail in a rear view in perspective. As can be seen in FIG. 3, the housing 12 comprises a rear, second space 50. In accordance with some embodiments the second space 50 is sealed from the third space 40 by a wall 53. The wall 53 can, but is not necessarily formed as an integral part of the housing 12. In some embodiments, the wall 53 could instead be formed by a separate part that seals the third space 40 from the second space 50. However, in the embodiment shown in FIG. 3 the wall 53 is integral with the housing 12. For example, the wall 53 can be cast as a part of the housing 12. The wall 53 can in accordance with some embodiments have a generally flat surface. Also, the wall 53 can extend over a large part of the cross section of the housing 12. For example, the wall 53 can occupy at least 50% of the area of the section of the housing or even 70% or more of the cross section of the housing 12. Hereby a large cooling area towards the third space 40 comprising the coolant is provided. Further, the wall 53 can have a protruding surface 52. The protruding surface 52 can be generally flat. The protruding surface 52 can be arranged to provide a dedicated cooling surface that can be close to the heat emitting circuitry to be located in the second space 50. In particular, driving circuitry for the motor can be located on or close to the protruding surface 52. Further, an opening 55 can in accordance with some embodiments be provided in the wall 53 for receiving a rear part of a shaft of the motor to be housed in the housing 12. As an alternative, a wall can in a similar manner be formed to separate the third space 40 from the first space 30.

Figure 4A:
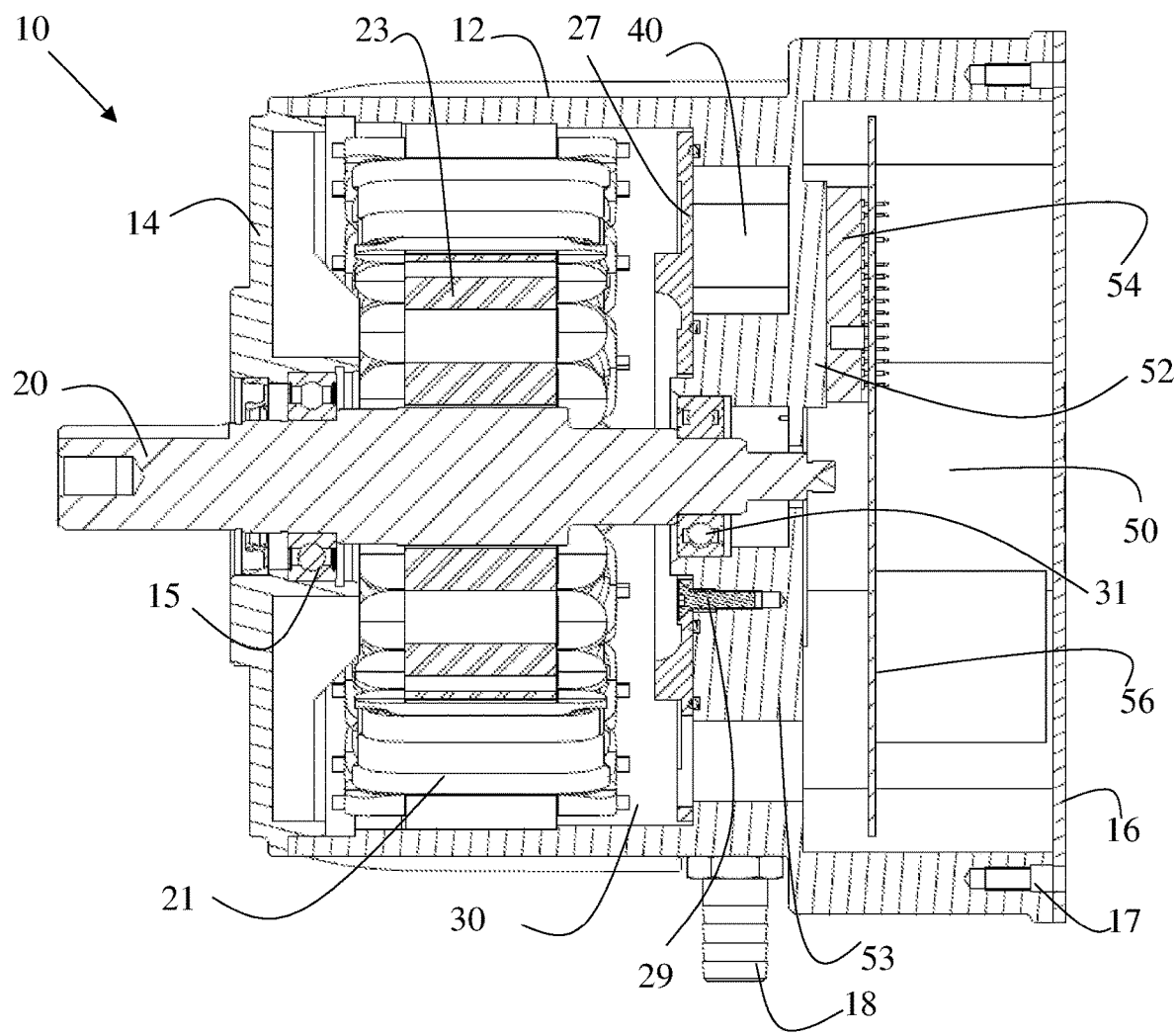
FIGS. 4a and 4b are sectional views of an electric machine in accordance with different embodiments.

In FIG. 4a, a sectional view from the side of the motor 10 is shown. As is seen in FIG. 4a, the housing 12 has a first space 30 for housing a stator 21 and a rotor 23. Further, the housing comprises a second space 50 for housing electronics 54 for controlling the motor. The housing also comprises a third space 40 for receiving a liquid coolant, such as water. The coolant can enter the third space 40 via an inlet 18. The third space 40 is located between the first space 30 and the second space 50 seen in the axial direction of the rotor shaft 20 of the motor 10. In particular, the third space 40 can be generally disc shaped having a width in the order of a few centimeters such as between 0.5 and 10 cm and in particular between 1.5 and 5 cm. The top and bottom sections of the disc-shaped third space 40 will then face the first space 30 and the second space 50, respectively. In the embodiment of FIG. 4a the cooling liquid will flow through the housing 12 of the electric machine only in a radial direction of the electric machine. Hereby the flow resistance will become low. The geometry of the third space will be described in more detail below. The motor 10 also comprises a front member 14 that covers the first space 30 and which front member 14 also can support a shaft 20 of the motor 10. To support the shaft 20, the front member can comprise bearings 15. At the bottom section of the first space 30, a lid 27 can be provided. The lid 27 seals the first space 30 from the third space 40. The lid 27 can have a relatively large surface area facing the first space 30 and which also can face the third space 40. The lid 27 can in accordance with some embodiments have a generally flat surface. Also, the lid 27 can extend over a large part of the section of the housing 12. For example, the lid 27 can occupy at least 50% of the area of the cross section of the housing or even 70% or more of the cross section of the housing 12. Hereby a large cooling area towards the third space comprising the coolant is provided. The lid 27 can be attached to the housing 12 via suitable means such as screws 29 or by other suitable means such as glue, rivets or a snap-fit.

Further, the second space 50 can house electronics 54 to be cooled by the cooling arrangement formed by the coolant fed to the third space 40. The electronics 54 can typically comprise an inverter and/or a control unit used for operating the motor 10. The electronics 54 can be mounted on a circuit board 56 located in the second space 50. The electronics 54 can in accordance with some embodiments be located at or very close to a protruding surface 52 of the wall 53. In accordance with one embodiment at least one electrical circuit of the electronics 54 rests against the wall 53 or a protruding surface 52 thereof. In accordance with one embodiment at least one electrical circuit of the electronics 54 is located less than 2 mm from the wall 53 or the surface 52.

Further, as can be seen in FIG. 4a, the shaft 20 of the electric motor 10 can have a rear bearing 31 that supports the shaft 20. The rear bearing can in accordance with one embodiment be provided in a center section of the wall 53. Also, in accordance with some embodiments a rear part of the shaft 20 can extend into the second space 50. Further the second space 50 can be closed from the outside by a back section 16. The back section 16 can be attached to the housing 12 by means of screws 17 or similar means such as a glue, rivets or a snap-fit.

Figure 4B:
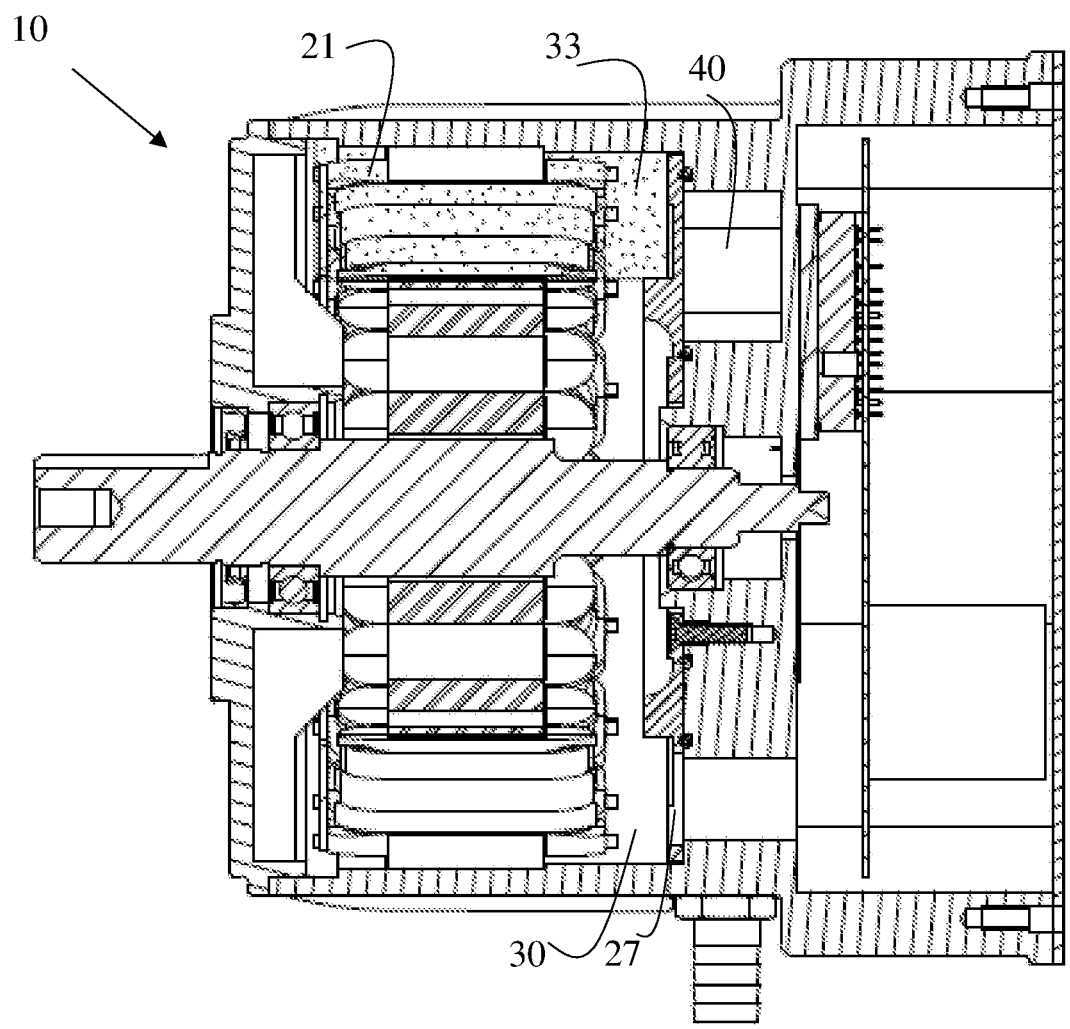

In FIG. 4b, a view similar to FIG. 4a is shown. In accordance with the embodiment shown in FIG. 4b a potting compound 33 is provided in the first space 30. The potting compound 33 is provided to improve heat transfer from the stator 21 to the cooled inner surface of the first space 30. The potting compound 33 can be provided radially between the stator 21 and the surface of the first space 30. Additionally, or as an alternative the potting compound can be provided between the stator and the lid 27 being cooled by the cooling arrangement in the third space 40. Alternatively, in accordance with one embodiment, the stator is assembled with a press fit between the outside diameter of a stator steel lamination and the inner diameter of the housing ensuring a good heat transfer from the steel lamination to the housing. The potting compound is used to transfer heat from copper wires to the steel lamination and to the housing. The potting compound 33 can be any suitable commercial compound and the potting compound 33 can fill the entire stator 21.

Figure 5A:
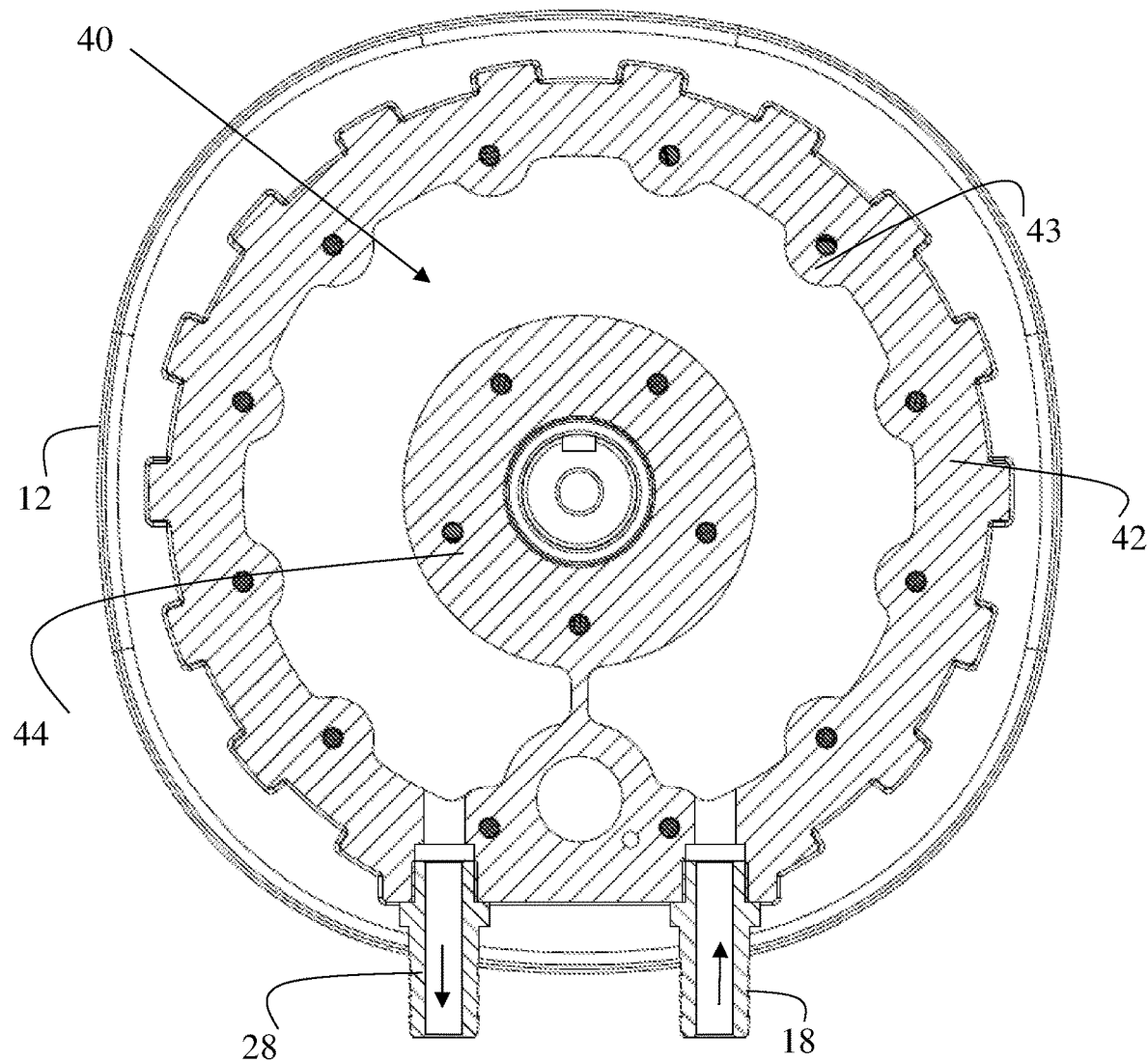
FIGS. 5a and 5b are views of a sandwiched cooling arrangement for an electric machine.

In FIG. 5a, a front view of the third space 40 is shown. The third space 40 comprises at least one inlet 18 and at least one outlet 28. In the embodiment in FIG. 5a, the inlet 18 and the outlet 28 are located on the same side of the motor housing 12. However, the inlet(s) and outlet(s) can be located at other locations. In use, the coolant, such as water, will flow in the third space 40 from an inlet 18 to an outlet as indicated by the arrows thereby cooling the parts delimiting the third space 40. The third space 40 can in accordance with some embodiments be delimited by for example the lid 27 and the wall 53 and also by a section of the housing 12 such as an outer ring 42. In accordance with other embodiments the wall 53 is replaced by a second lid. The ring 42 can have any suitable shape that closes the third space 40. The shape can for example be circular. In accordance with some embodiments the inner surface of the ring 42 has projections 43 formed thereon. The projections 43 contributes to increase circulation of the coolant in the third space 40, thereby increasing the cooling effect of the cooling arrangement of the motor 10. Such an embodiment can be advantageous if the requirements on flow resistance are less strict.

In accordance with some embodiments the third space 40 has a center member 44. The center member 44 can for example support a rear part of the shaft 20 as is described above.

Figure 5B:
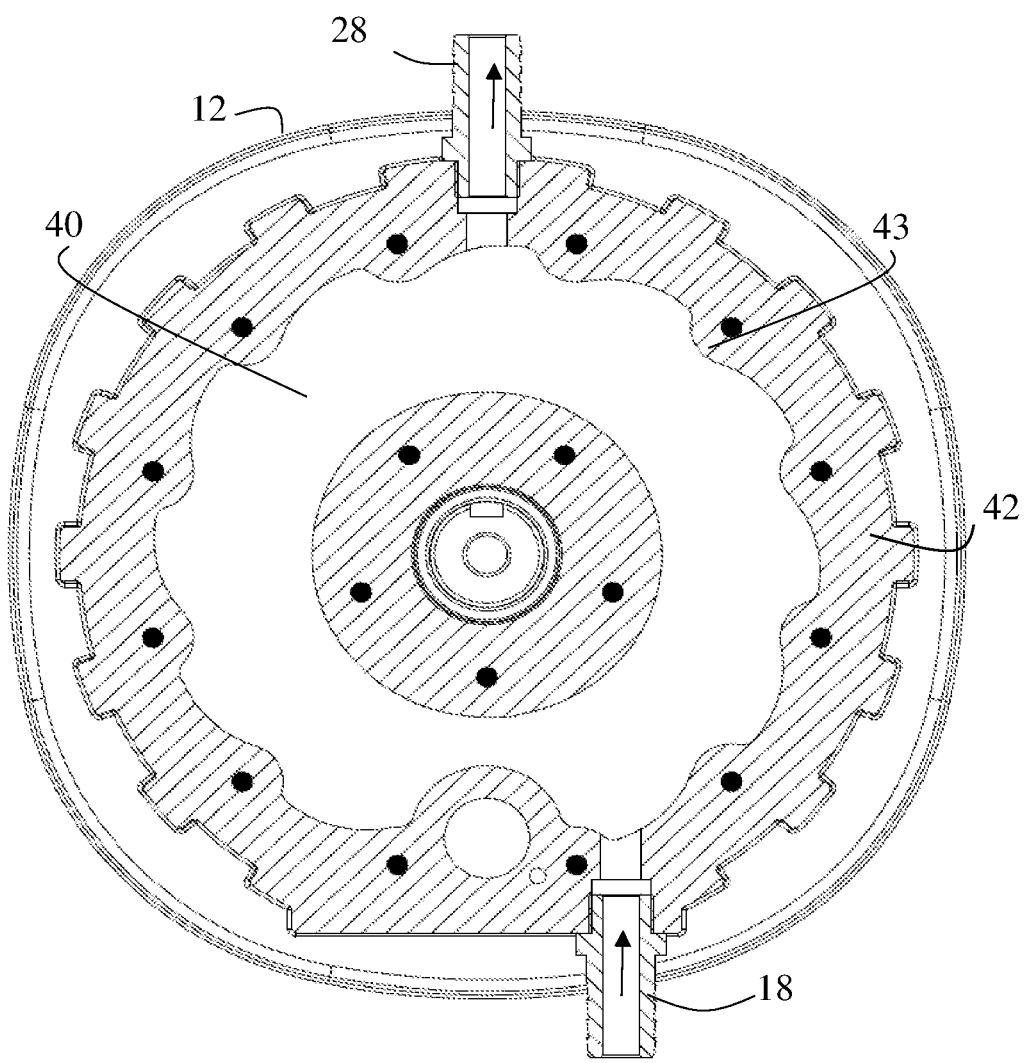

In FIG. 5b, an alternative embodiment of the third space 40 is shown as a front view. In the embodiment of FIG. 5b the inlet 18 to and the outlet 28 from the third space 40 are placed on different, in particular opposite, sides of the housing 12. As is set out above other configurations of the inlet(s) 18 and outlet(s) 28 are possible. For example, multiple inlets and or multiple outlets can be provided to increase flow inside the third space 40 and thereby increase the cooling capacity of the arrangement provided by the third space 40. Also, provision of multiple inlets and outlets can act to reduce the resistance in the flow through the cooling arrangement formed in the electric machine by the third space 40.

Also, as is shown in FIG. 5b, the projections 43 of the ring 42 can be shaped differently with asymmetric flanges as opposed to the embodiment in FIG. 5a where the flanges of the projections are symmetric.

Figure 6:
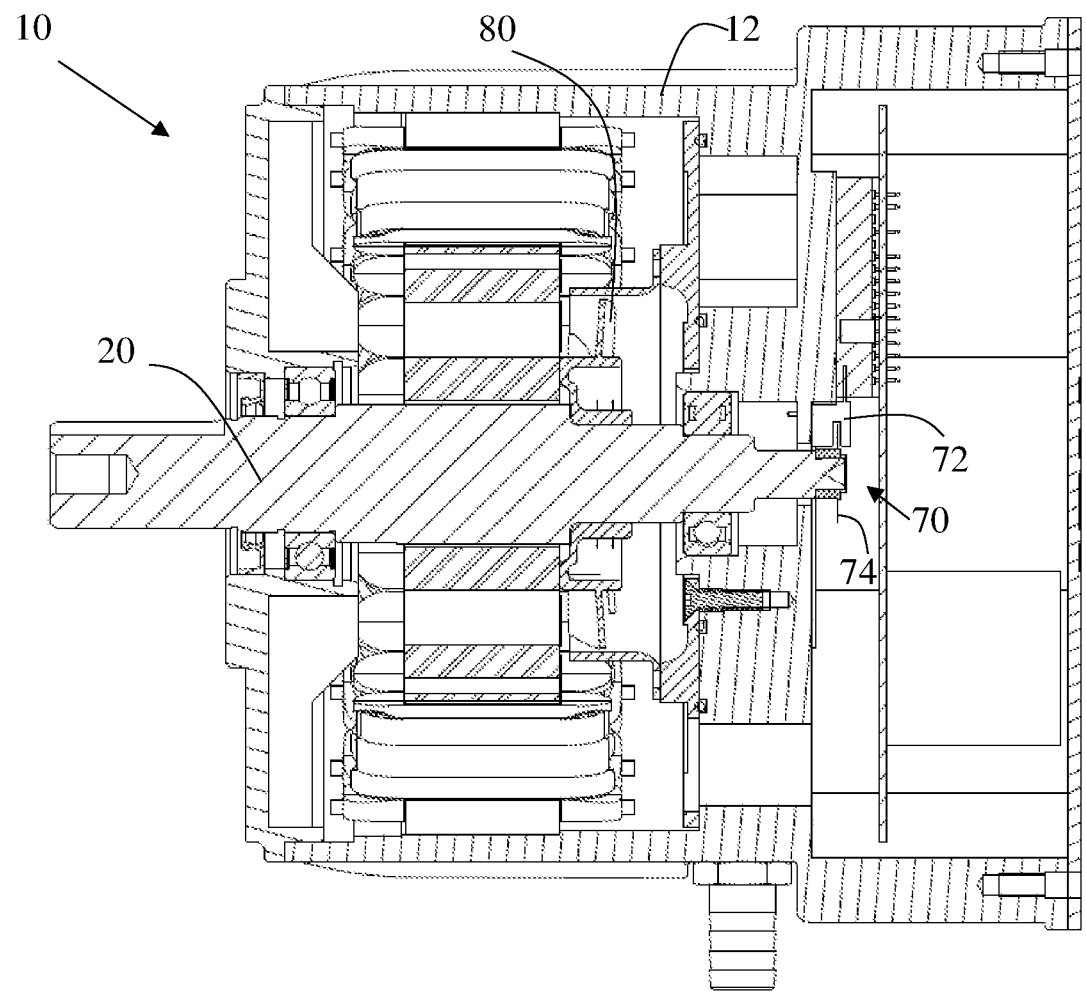
FIG. 6 is a sectional view of an electric machine illustrating additional components of the electric machine.

In FIG. 6, a view similar to FIG. 4 is shown. The motor 10 of FIG. 6 has some additional components compared to the motor 10 shown in FIG. 4. The motor 10 of FIG. 6 comprises a member 80 configured to provide an air flow within the first space 30. The member 80 can for example be a fan located on the shaft of the rotor. By providing a member 80 an air-flow in the first space 30 can be generated. The generated air flow can help to transport heat from the rotor to be cooled by the inner surfaces of the first space 30, in particular the surface facing the third space 40 that is being cooled by the coolant.

In addition, an encoder 70 can be provided at the rear end of the shaft 20 of the rotor. The encoder can be provided in the second space 50. This will require that the rear end of the shaft 20 extends into the second space 50. The encoder 70 can provide a signal indicative of the rotational speed and/or position of the shaft 20. This can be useful in control of the motor speed and/or also for other purposes. The encoder 70 can for example be formed by a disc 74 provided with markings. The disc 74 can rotate past a reader 72 that reads the passing of the markings to provide a signal indicative of the rotational speed of the shaft. Other well-known encoder arrangements such as magnet-hall sensor, optical sensors or resolver can alternatively be provided at the rear end of the shaft 20.

The invention claimed is:
1. An electric machine provided with a liquid cooling arrangement, the electric machine comprising:
  a stator;
  a rotor having a shaft;
  electronics for operation of the electric machine;
  a housing formed as one monolithic unitary element, the housing comprising:
    a first space housing the stator and the rotor,
    a second space housing the electronics, and
    a third space located, seen in an axial direction of the shaft, between the first space and the second space, the third space comprising at least one inlet for a cooling liquid and at least one outlet for the cooling liquid.

2. The electric machine according to claim 1, wherein the housing is cast.

3. The electric machine according to claim 1, wherein the third space is arranged to be sealed from the first space by a lid.

4. The electric machine according to claim 3, wherein the lid is a part of the stator.

5. The electric machine according to claim 3 wherein at least one sealing member is provided in at least one of the lid and/or a section of the housing defining the third space.

6. The electric machine according to claim 1, wherein the third space is arranged to be sealed from the second space by a lid.

7. The electric machine according to claim 6, wherein the lid is a part of the electronics.

8. The electric machine according to claim 1, wherein said electronics is located on a protruding surface of the second space facing the third space.

9. The electric machine according to claim 1, wherein a member for providing an air flow in the first space is provided in the first space.

10. The electric machine according to claim 9, wherein said member for providing an air flow is a fan mounted on the shaft of the rotor.

11. The electric machine according to claim 1, wherein the shaft of the rotor extends into said second space and where a portion of the shaft extending into the second space is provided with a code element for an encoder.

12. The electric machine according to claim 11, wherein a reader of the encoder is located in the control electronics.

13. The electric machine according to claim 1, wherein the third space is disc shaped.

14. The electric machine according to claim 1, wherein a wall separates the third space from the second space.

15. The electric machine according to claim 14, wherein the wall is formed as an integral part of the housing.

16. The electric machine according to claim 1, wherein the housing is configured to allow the cooling liquid to flow through the third space only in radial direction of the electric machine.

17. The electric machine according to claim 1, further comprising a potting compound provided between the stator and the inner surface of the first space.

18. The electric machine according to claim 1, wherein the electric machine is a permanent magnet motor.

19. A housing configured to house an electric machine, the housing being formed as one monolithic unitary element and configured to form:
- a first space in which first space a stator and a rotor are to be located,
- a second space in which second space electronics for operation of the electric machine is to be located, and
- a third space formed in the housing between the first space and the second space,
- the housing comprising at least one inlet for a liquid to the third space and at least one outlet for the liquid from the third space.

20. The housing according to claim 19, wherein the housing is cast.

21. The housing according to claim 19, further comprising a wall separating the third space from the second space, the wall being an integral part of the housing.

* * * * *